Oct. 31, 1944.   H. L. DOWELL   2,361,827
HOSE COUPLING
Original Filed Feb. 26, 1943
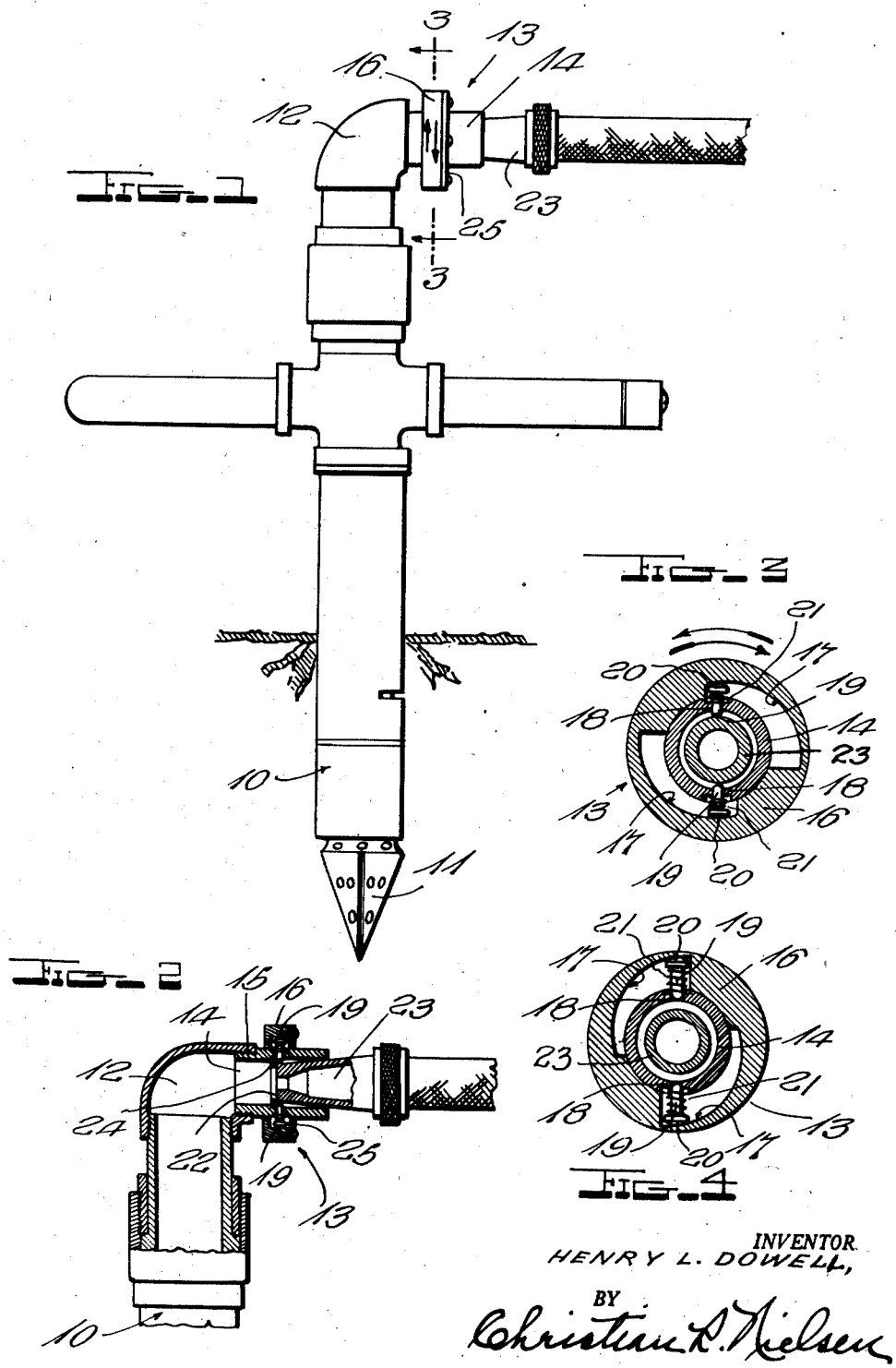
INVENTOR.
HENRY L. DOWELL,
BY
Christian L. Nielsen
ATTORNEY Patented Oct. 31, 1944

2,361,827

UNITED STATES PATENT OFFICE 2,361,827

HOSE COUPLING

Henry L. Dowell, Athens, Tex., assignor of one-half to George Isaac Shelton, Athens, Tex.

Original application February 26, 1943, Serial No. 477,282. Divided and this application July 21, 1943, Serial No. 495,641

1 Claim. (Cl. 285—169)

This invention relates, to a coupling device for conduits and the like and it consists in the constructions, arrangements and combinations herein described and claimed.

It is the cardinal object of the invention to provide a quick acting coupling device whereby a pair of conduits or fittings may be securely interconnected, forming a liquid or fluid-tight connection therebetween, and is particularly useful in constructions as set forth in pending application on nozzle for Fire hose, filed February 26, 1943, Serial No. 477,282, and of which this application is a division.

It is also a particular object of the invention to provide a coupling device in which connection of the parts may be accomplished without use of screw-threaded fittings and in which the couplings may be accomplished without the use of tools.

Additional objects, advantages and features of invention will be apparent from the following description and accompanying drawing, wherein Figure 1 is a side elevation of the coupling installed upon a fire hose nozzle.

Figure 2 is a vertical section through the coupling, the nozzle being shown in elevation.

Figure 3 is a cross section on the line 3—3 of Figure 1, illustrating the locked position of the coupling.

Figure 4 is a similar view illustrating the unlocked position of the coupling device.

There is illustrated a discharge nozzle generally indicated by the reference character 10, which has been chosen as the device upon which the coupling device is to be installed. The interior structure of the nozzle 10 is immaterial to the understanding of the coupling, it being understood that a liquid fluid is to be supplied to the nozzle for discharge through the discharge tip 11.

The nozzle 10 has an elbow 12 at its upper end to which the coupling device 13 is to be installed. Obviously, the elbow 12 could be an ordinary straight or otherwise shaped fitting. A nipple 14 is employed, cylindrical in shape, one end of which is threaded as at 15 for engagement with the threads of the elbow fitting 12.

Rotatably mounted upon the nipple 14 there is a body member 16 of substantial thickness, and within the body member, at diametrically opposite sides there are formed arcuate tapering passage-ways 17, the passage-ways tapering in opposite directions. The nipple 14 is provided with diametrically opposite openings 18 in which respective pins 19 are slidably mounted. The pins 19 have a head 20 and between the heads and a seat formed around the openings 18 respective helical springs 21 are interposed tending to draw the pins from the openings. The heads of the pins transverse the slots under rotation of the body member 16 and in clockwise rotation of the body member, the reduced portion of the passage-ways 17 will contact the heads 20, forcing the pins inwardly through the openings 18, downwardly behind a flange 22 of a nozzle 23, drawing the flange into snug engagement with a gasket 24 of the nipple 14. The device will thus be effectively coupled to the nozzle 23. Counter-clockwise rotation of the body member 16 will bring the greater depth of the passage-ways 17 into operative position with the heads of the pins, allowing the springs to function and withdraw the pins from engagement with the flange 22, and thus allow the nozzle 23 to be disconnected from the nipple 14. A closure plate 25 is employed to house the pins and springs and also prevent ingress of foreign matter which might affect proper operation of the coupling device.

While I have shown and described my construction, this is by way of illustration only, and I consider as my own all such modifications in construction as fairly fall within the scope of the appended claims.

I claim:

A fire hose coupling comprising a nipple for attachment to a nozzle, the nipple having an annular interior shoulder, a compression washer engaged with the shoulder, said nipple further having a plurality of radial openings in advance of the shoulder and compression washer, a rotatable member on the nipple having arcuate tapering slots opening upon the nipple, a pin engaged in respective openings of the nipple, each pin having a head disposed in respective slots, a spring interposed between the head of each pin and said nipple, whereby the pins will be retracted at one position of the rotatable member, a fitting complemental to the interior diameter of the nipple and having an annular flange adapted to abut said washer, said pins being projectable through the openings to positions rearwardly of the flange in one direction of rotation of said rotatable member.

HENRY L. DOWELL.